United States Patent [19]
Wehrmann et al.

[11] Patent Number: 5,295,771
[45] Date of Patent: Mar. 22, 1994

[54] CLEAN ROOM TOOL CHAMBER

[75] Inventors: Gary Wehrmann; Henry J. Thomas; James Perrin; Ernest H. Sierra, Jr.; Robert C. Wegmann, all of San Antonio, Tex.

[73] Assignee: Sony Electronics Inc., Park Ridge, N.J.

[21] Appl. No.: 936,826

[22] Filed: Aug. 28, 1992

[51] Int. Cl.$^5$ ............................................. B23B 47/00
[52] U.S. Cl. .................................. 408/67; 15/300.1; 312/1; 408/76; 408/241 G
[58] Field of Search .................. 15/300.1, 301, 345; 312/1; 408/67, 76, 241 G; 51/273; 144/252 R; 409/134, 137

[56]  References Cited

U.S. PATENT DOCUMENTS

| | | | |
|---|---|---|---|
| 3,162,066 | 12/1964 | Morey et al. | 408/76 |
| 4,921,375 | 5/1990 | Famulari | 408/67 |
| 4,924,732 | 5/1990 | Hoskins | 81/54 |
| 4,928,348 | 5/1990 | Clayton | 15/345 |
| 5,034,041 | 7/1991 | Austin | 144/252 R |
| 5,062,871 | 11/1991 | Lemon, III | 312/1 |
| 5,088,511 | 2/1992 | Bain | 312/1 |

FOREIGN PATENT DOCUMENTS

| | | | |
|---|---|---|---|
| 3004066 | 8/1981 | Fed. Rep. of Germany | 312/1 |
| 2067106 | 7/1981 | United Kingdom | 408/67 |

OTHER PUBLICATIONS

"Portable Clean Air Anywhere"/Microcontamination Magazine/International Portland Corp., Hillsboro, OR, U.S./Jul. 1992/Reader Service No. 152 (Advertisement).

Clean Room Magazine/Ray Products Inc., El Monte, CA, U.S./Apr. 1992/(Advertisement).

*Primary Examiner*—Daniel W. Howell
*Attorney, Agent, or Firm*—Jerry A. Miller; Pasquale Musacchio

[57]  ABSTRACT

A device for preventing contamination of a clean room during a drilling or cutting operation. A box-like chamber is provided for containing a power driven tool such as a drill. One wall of the chamber includes an opening for access to the workpiece (e.g. a wall to be cut or drilled). Another wall includes an access port with a rubber glove for operating the power tool. A pigtail electrical outlet within the chamber provides electrical power to the tool. A similar chamber may be used on an opposite side of the wall being drilled in the event it must be kept clean also. Both chambers include a port for attachment to a vacuum source such as a conventional vacuum cleaner and a port for entry of air to divert debris away from the workpiece and into the vacuum cleaner. In another embodiment, a small enclosure is clamped to the body of a drill or similar tool. The enclosure includes a vacuum port for removal of the debris.

23 Claims, 10 Drawing Sheets

CLEAN ROOM TOOL CHAMBER

BACKGROUND

1. Field of the Invention

The present invention relates to a box-like debris containment chamber for surrounding at least a part of a power driven tool such as a drill. More particularly, it relates to a tool chamber which can be connected to a vacuum to remove contaminates from the workpiece and is, therefore, suitable for use in a clean room.

2. Background of the Invention

It is important to keep facilities such as clean rooms for manufacturing semiconductors, operating rooms in hospitals, etc. as clean as possible. When maintenance or other work which might require, for example, making holes in their walls, maintaining the cleanliness of the room is difficult. In an open environment, a saw will generate as many as 15,000 particles of debris in approximately 15 seconds. Generation of such debris can radically exceed the allowable level for clean room contaminants in a short period of time.

In "Power Driven Screwdriver with Vacuum for Removing Contaminants" U.S. Pat. No. 4,924,732 issuing May 15, 1990 to Hoskins et al., a screwdriver is disclosed with a forward end portion of its sleeve telescoped over a head of a screw. A closed cavity around both a motor and a spindle includes the axial bore of the sleeve to communicate air from the open forward end rearwardly.

SUMMARY OF THE INVENTION

It is an object of the present invention to provide a device for making holes or cuts in a clean room wall without contamination of the clean room with particles generated during the process.

It is another object of the present invention to provide a device for use with any power driven tool, for connection to a vacuum cleaner to isolate contamination from a clean room.

A device for preventing contamination of a clean room during a drilling or cutting operation is disclosed. A box-like chamber is provided for containing a power driven tool such as a drill. One wall of the chamber includes an opening for access to the workpiece (e.g. a wall to be cut or drilled). Another wall includes an access port with a rubber glove for operating the power tool. A pigtail electrical outlet within the chamber provides electrical power to the tool. A similar chamber may be used on an opposite side of the wall being drilled in the event it must be kept clean also. Both chambers include a port for attachment to a vacuum source such as a conventional vacuum cleaner and a port for entry of air to divert debris away from the workpiece and into the vacuum cleaner. In another embodiment, a small enclosure is clamped to the body of a drill or similar tool. The enclosure includes a vacuum port for removal of the debris.

In one aspect of the present invention, a device for use with a drill, saw or other such tool for making penetrations for removing air borne contaminations adjacent a workpiece surface includes a chamber member. The chamber member has an opening to be aligned with a workpiece surface and also has a transparent side wall extending perpendicular from the workpiece surface for surrounding the workpiece. The side wall of the chamber has an air intake hole in its upper portion and another hole connected to a vacuum cleaner so that air flow can be generated on the workpiece along the surface.

In accordance with the preferred embodiment of the present invention, an air chamber of the device surrounds a power driven tool (or a part thereof) and it is not formed within a housing of the tool. Therefore, the device can be used with ordinary power tools such as drills and the like. The air flow can be generated in the chamber, preferably from top to bottom along the surface of the workpiece, so that the particles of debris from the workpiece can be efficiently collected by the vacuum.

BRIEF DESCRIPTION OF THE DRAWING

The invention will be more readily understood with reference to the accompanying drawing, wherein.

DESCRIPTION OF THE INVENTION

Figure 1:
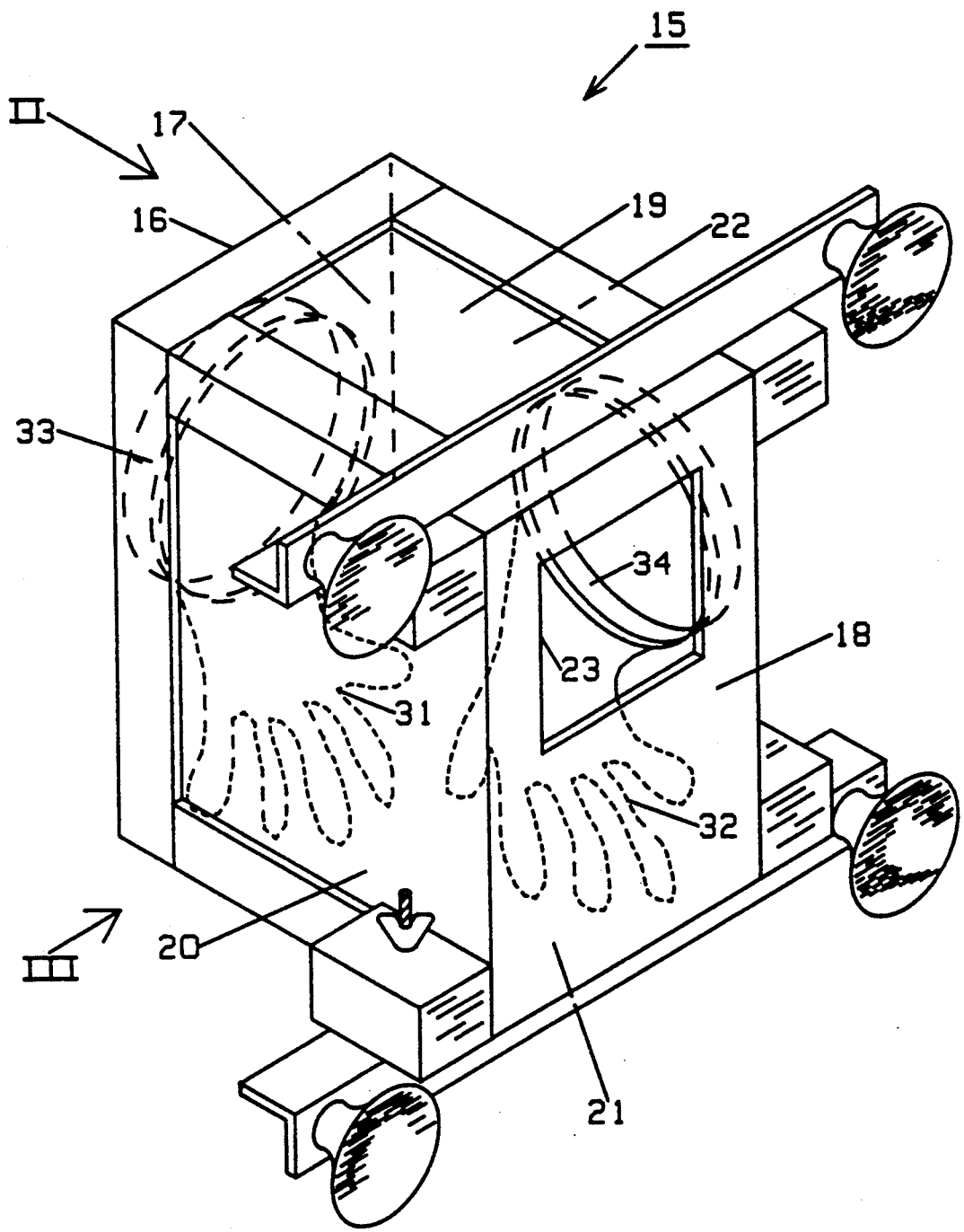
FIG. 1 shows a perspective view from the rear of a tool chamber of the present invention.

Referring to FIG. 1, a tool chamber 15 has aluminum frames 16 defining a cube with transparent plastic front wall 17, rear wall 18 and side walls 19, 20, 21 and 22 arranged between the frames. In this embodiment, the chamber 15 is about ten inches in width, fifteen inches in length and seventeen inches in depth so that the chamber 15 has enough capacity to completely receive a power driven tool such as an electric drill. The rear wall 18 has a rectangular opening 23, preferably of approximately 7 inches in width and length. This opening 23 defines a working area when the chamber is attached to a workpiece.

Figure 2:
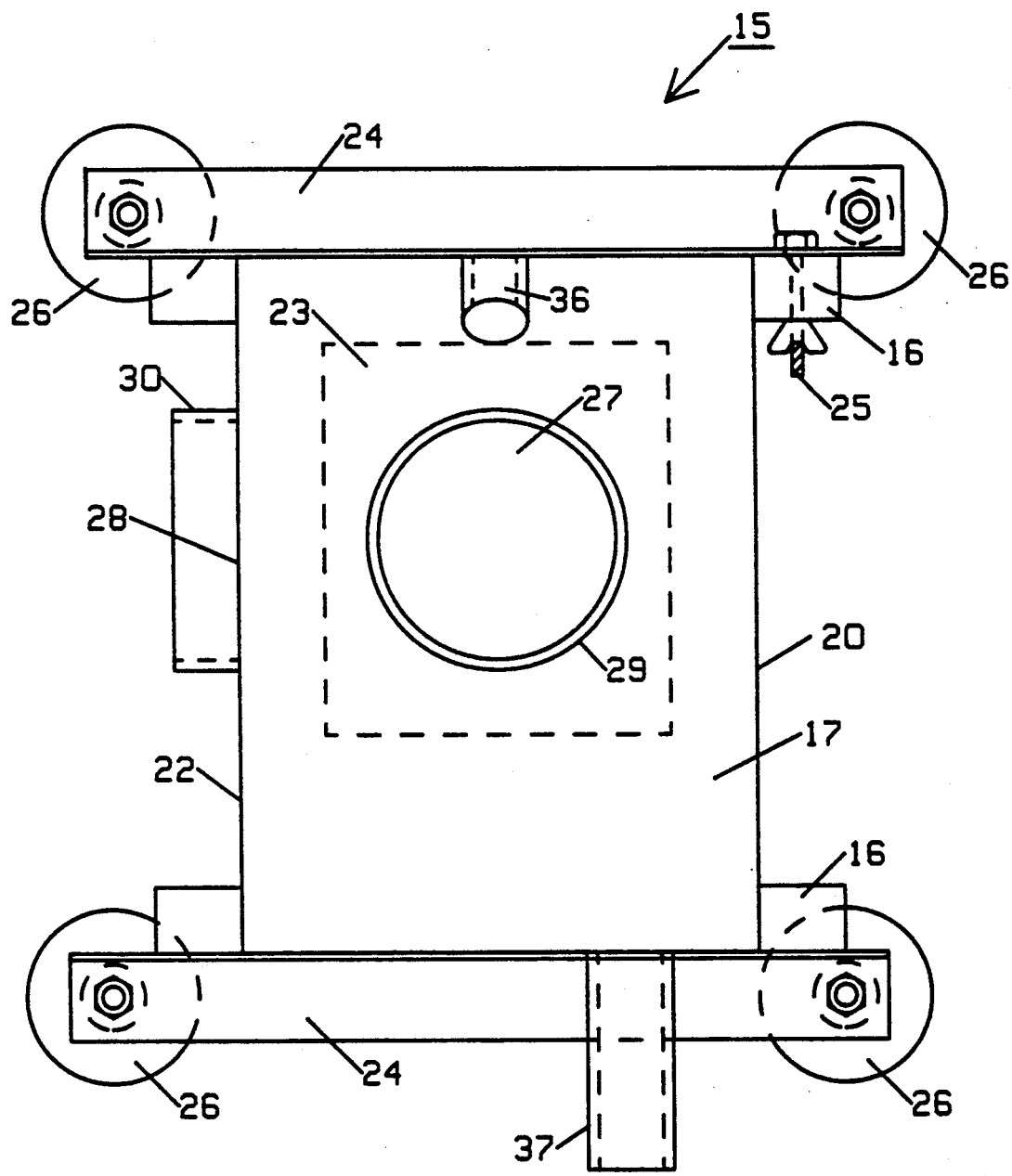
FIG. 2 shows a front view of the tool chamber of the present invention along the direction of arrow II in FIG. 1.
Figure 3:
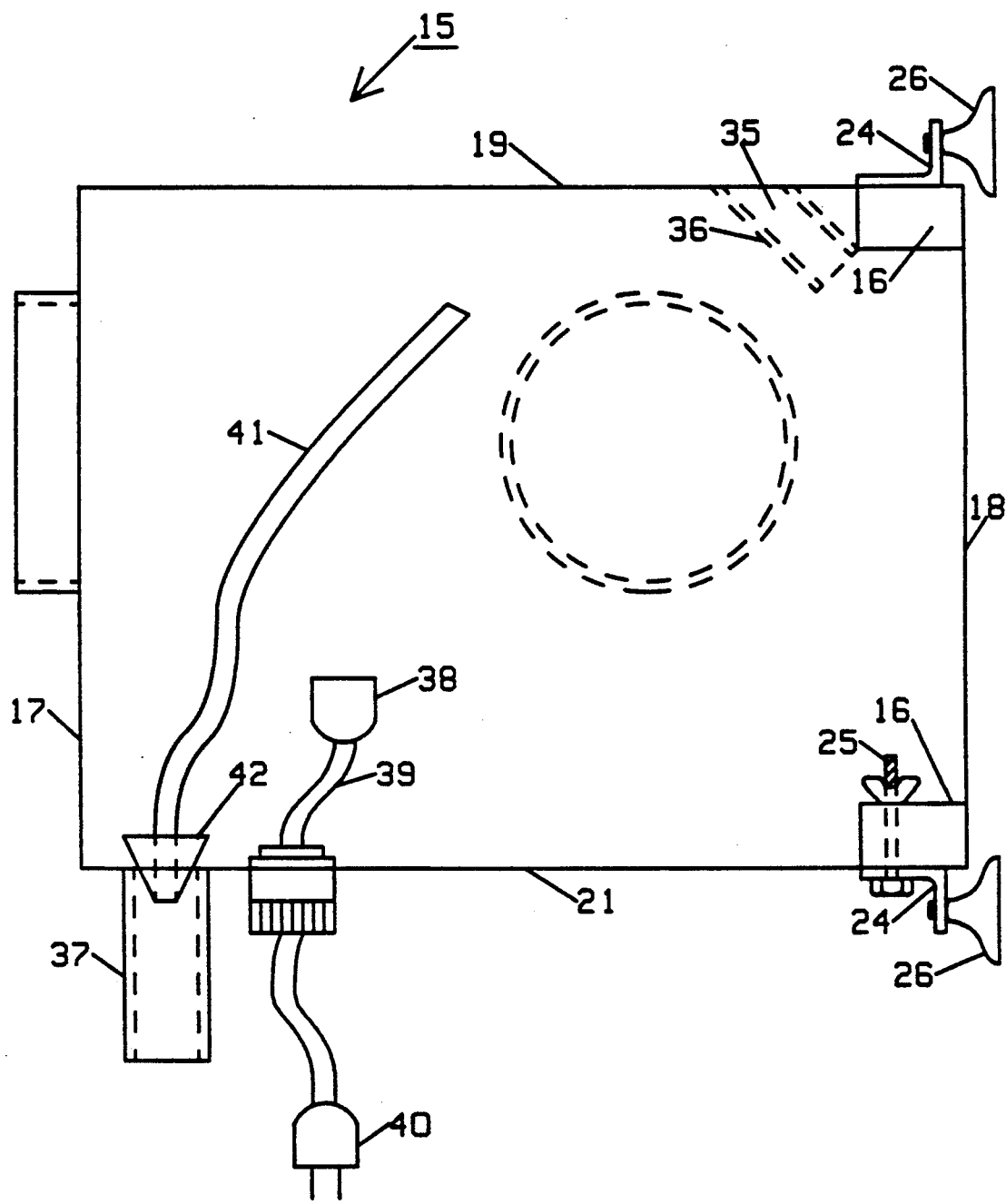
FIG. 3 shows a side view from the right of tool chamber of the present invention along the direction of arrow III in FIG. 1.

As may be more clearly understood with reference to FIGS. 2 and 3, parallel arms 24, fixed to the frames 16 by screws 25, extend horizontally. Suction cups 26 are mounted at both ends of the parallel arms 24, so that four cups may be arranged at four corners facing with the workpiece. There are two circular holes 27 and 28, each with about 5 inch diameter, in front and side walls 17 and 22 so that both hands of a user can be inserted into the chamber 15. Circular collars 29 and 30 extend perpendicular to walls 17 and 22. Rubber gloves 31 and 32 are attached inside the chamber 15. The open ends of gloves 31 and 32 are folded back over and around each of the circular collars 29 and 30, respectively, and then secured in place by circular clamps or bands 33 and 34.

In the upper side wall 19, an air intake 35 is preferably formed with a slanted collar 36 so that incoming air can be directed toward the opening 23 of the rear wall 18. As shown in FIG. 3, a vacuum port 37 extends outside the chamber 15 through the lower side wall 21. This port 37 is preferably made of 1¼ inch diameter tube so that an extended hose from a conventional house vacuum cleaner (not shown) can be easily attached to port 37. As shown in FIG. 1, inside the chamber 15, a flexible vinyl tube 41 extends from the port 37. A pigtail electric outlet 38 is arranged inside the box 15 for a power driven tool with an extension cord 39 through the lower side wall 21 to an electric plug 40. Other outlet configurations could also be used to provide power to the inside of the chamber. A flexible hose 41 attached to a stopper 42 can be inserted into vacuum port 37 so that the flexible hose 41 can be used to clean any accumulated debris from inside chamber 15.

Figure 4:
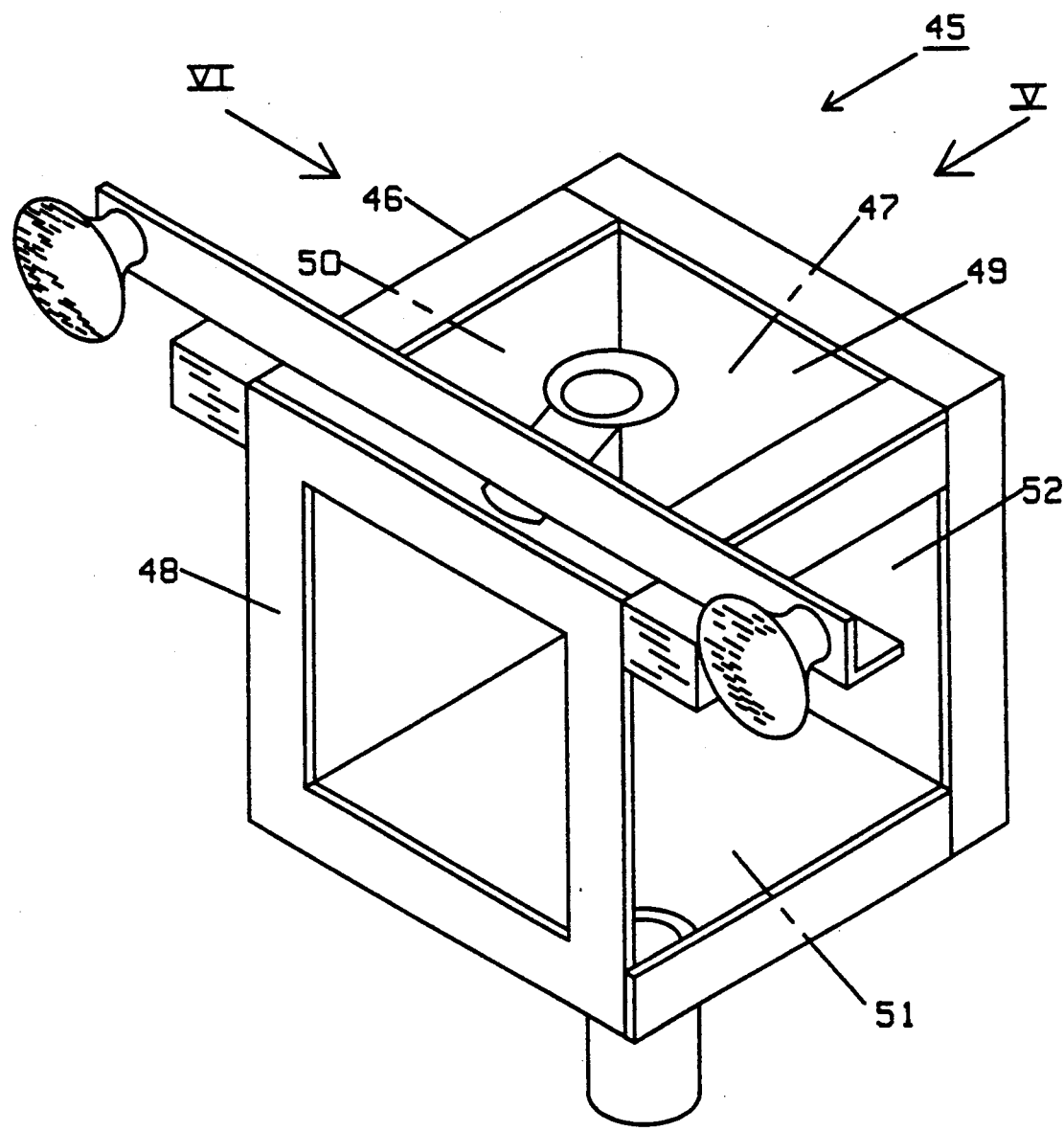
FIG. 4 shows a perspective view from the rear of a receptacle chamber as another embodiment of the present invention, which is used together with the device shown in FIG. 1.

Referring now to FIG. 4, a receptacle chamber 45 is disclosed as another embodiment of this invention. As will be discussed later in detail, the receptacle attachment 45 can be used together with the tool chamber 15 or may be used alone. The receptacle chamber 45 has aluminum cubic frames 46 with a transparent plastic front wall 47. Side walls 49, 50, 51 and 52 are arranged between them in a manner similar to those of tool chamber 15. A rectangular portion 48 has no wall and the entire area surrounded by the frames 46 forms a square opening eight inches in width and length in this embodiment. This creates an opening which is one inch larger in each direction than the opening 23 of the tool chamber 15.

Figure 5:
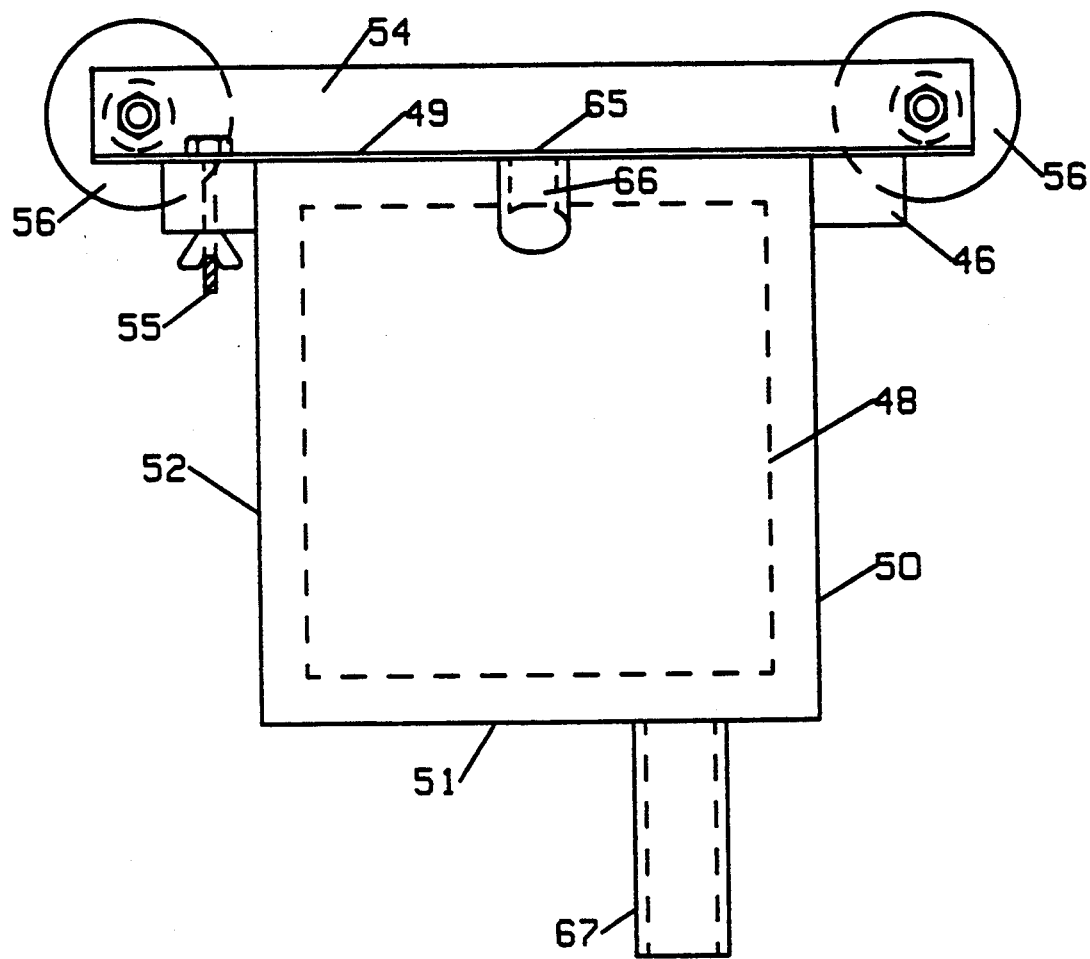
FIG. 5 shows a front view of the receptacle chamber of the present invention, along the direction arrow V in FIG. 4.
Figure 6:
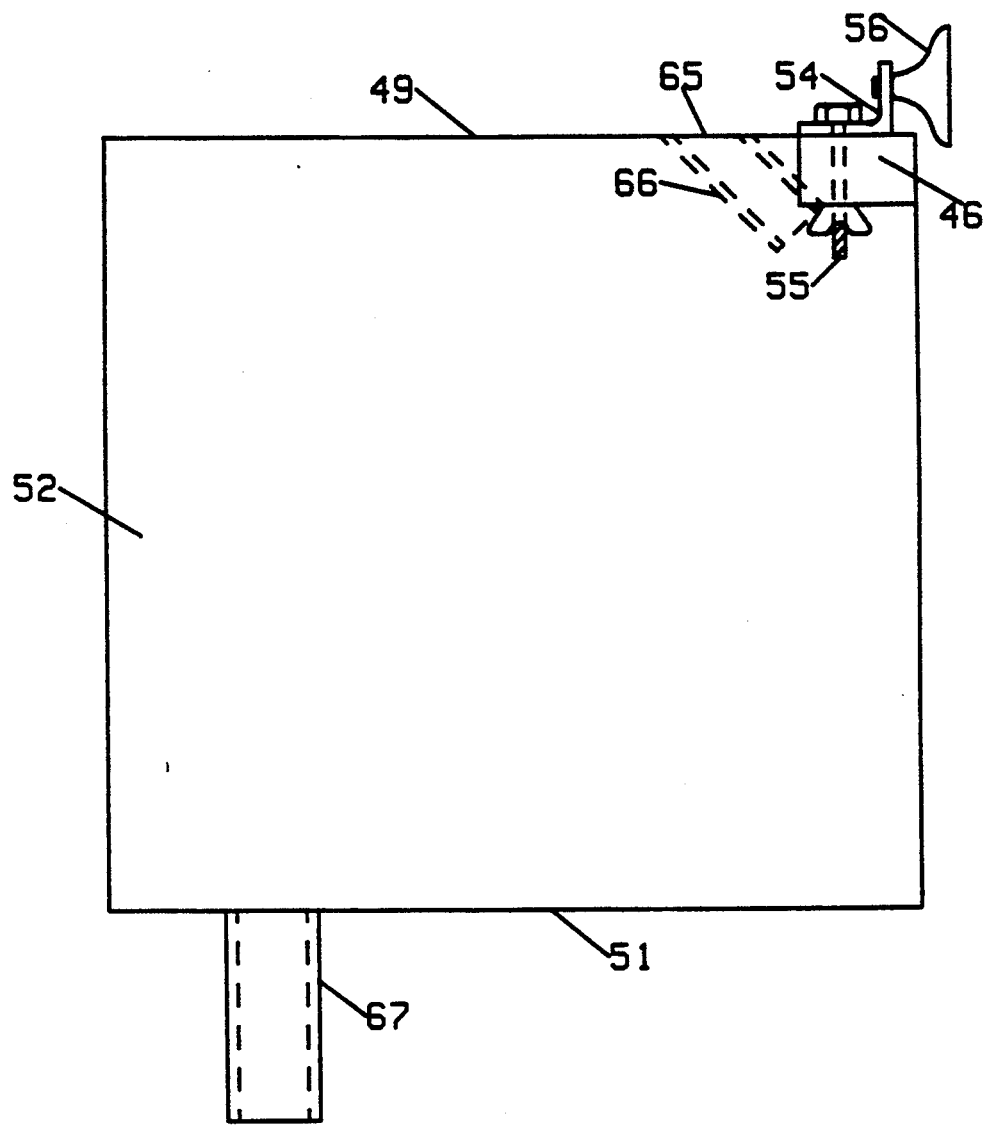
FIG. 6 shows a side view from the right of the receptacle chamber of the present invention along the direction of arrow VI in FIG. 4.

As will be apparent with reference to FIGS. 5 and 6, a single arm 54 is fixed to the frame 46 by, for example, a screw 55 and extends horizontally. Suction cups 56 are mounted at both ends of the single arm 54, so that two cups 56 can be arranged at two corners of the receptacle 45. Unlike the chamber 15, the receptacle chamber 45 has no holes for a user's hand. However, an air intake 65 with a slanted collar 66 and a vacuum port 67 are similarly formed respectively in the upper side wall 49 and in the lower side wall 51. Therefore, the incoming air can be also directed toward the opening square 48 of the receptacle chamber 45. Since this receptacle chamber 45 is not specifically designed to receive a power driven tool, there is no electric outlet arranged inside the receptacle chamber 45 as shown. Of course, one could be provided in other embodiments.

Figure 7:
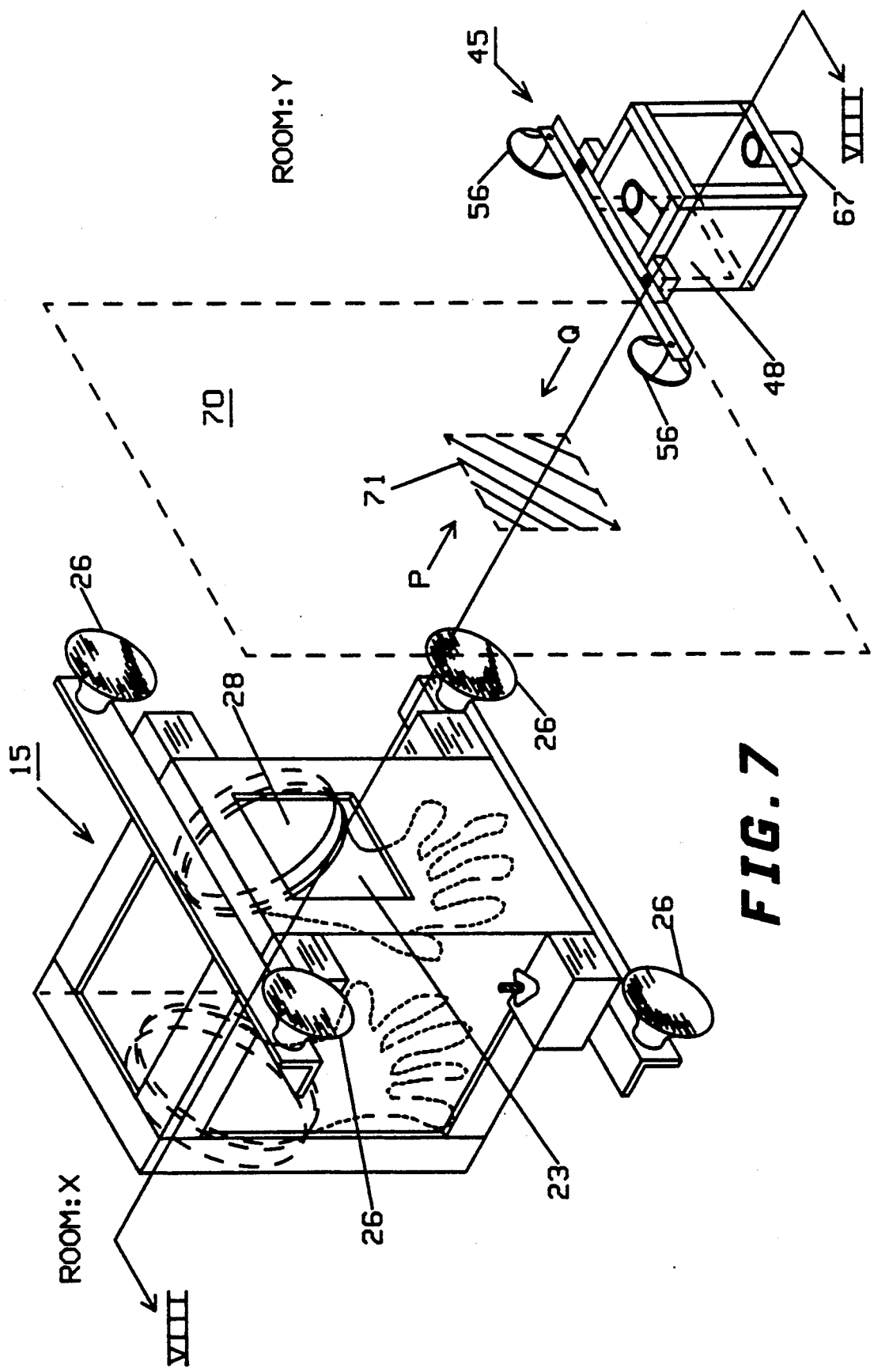
FIG. 7 shows how the chambers in FIGS. 1 and 4 are arranged with a wall (workpiece) between them.
Figure 8:
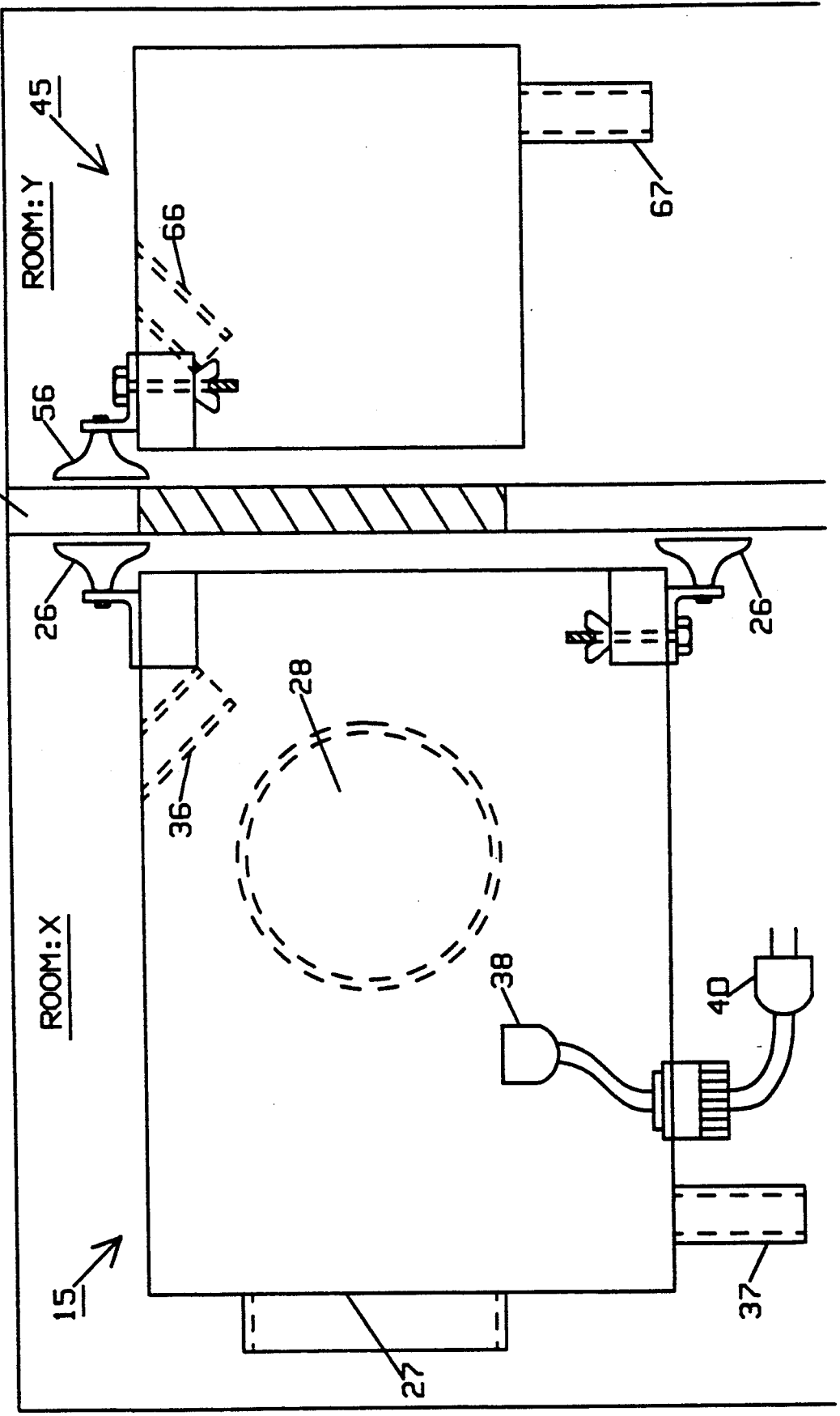
FIG. 8 shows a side view of the chambers along with a line VIII—VIII' in use.

Referring now to FIGS. 7 and 8, the arrangement of the tool chamber 15 and the receptacle chamber 45 during use will be described. Suppose that Rooms X and Y are divided by a partition wall 70 and drilled holes are required in an area 71 shown by oblique lines surrounded by dotted lines. These holes must be made without contaminating either clean room.

In room X, a drill (not shown) is placed inside the tool chamber 15 through the opening 23. By use of the suction cups 26 at the four corners (or other attachment mechanism), the tool chamber 15 is attached to a surface of the wall 70 along the direction of arrow P so as to have the opening 23 aligned with the working area 71. In room Y, the receptacle chamber 45 is attached to another surface of the wall 70 along another direction of an arrow Q by the suction cups 56 so as to have the rectangular opening 48 aligned with the rear surface of the working area 71. The cross-sectional view of FIG. 8 represents tool chamber 15 and the receptacle chamber 45 when attached to the partition wall 70. Each vacuum port 37 and 67 is respectively connected to house vacuums or vacuum hose connections located in the respective rooms X and Y.

The electric plug 40 is connected to an outlet (not shown) of a facility to supply electric power to the drill. The user inserts both hands inside the tool chamber 15 through the holes 27 and 28 to connect the drill to the pigtail electric outlet 38 and make appropriate holes anywhere in the working area using the drill. Contaminants coming out of the working area to either room X or Y can be blown from the work area by the incoming air through the intakes 36 and 66, and sucked out of the tool chamber 15 or the receptacle chamber 45 to the vacuums through the ports 37 and 67. The user may use the flexible vinyl tube 41 to remove by vacuum any particles of debris which might remain inside the chamber before he removes the box 15 from the wall 70.

Figure 9:
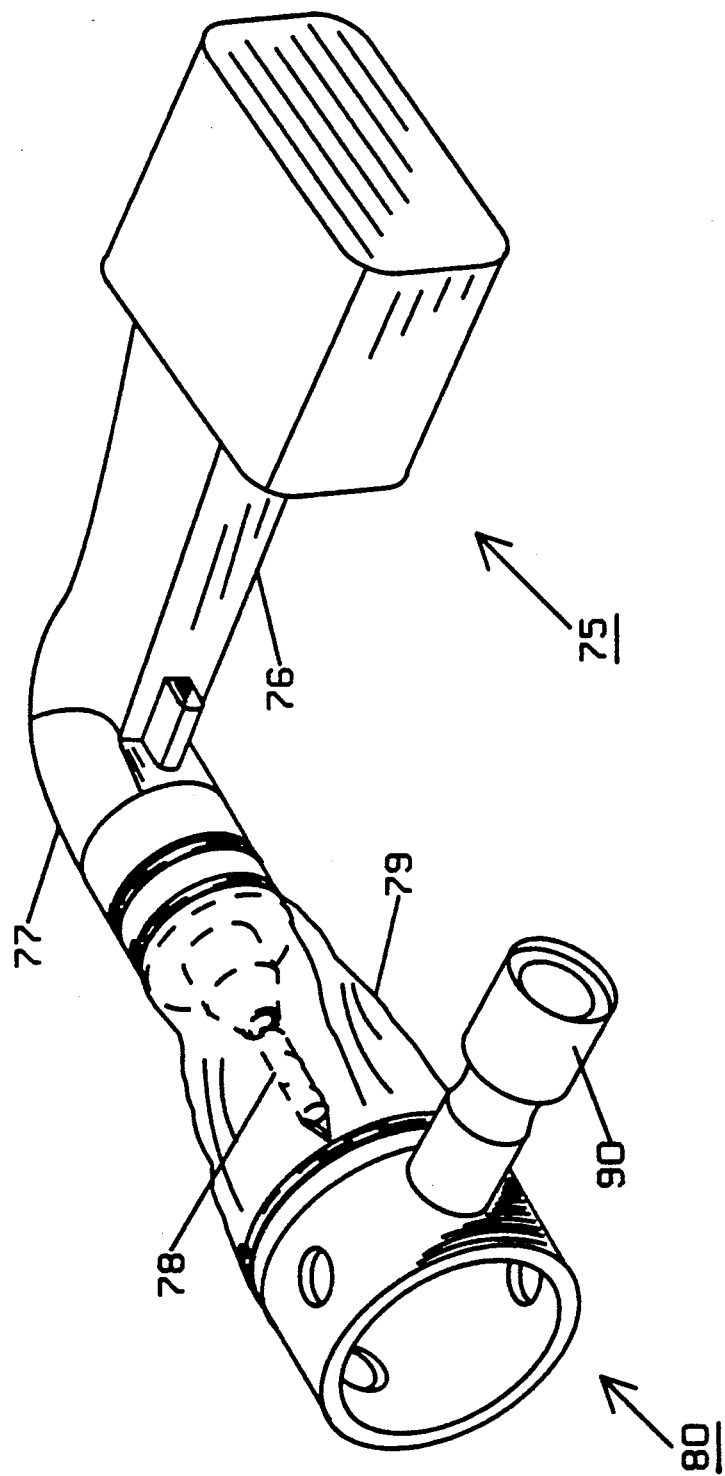
FIG. 9 shows a perspective view of a mini chamber as another embodiment of the present invention, which is attached to a front end of a power driven tool.
Figure 10:
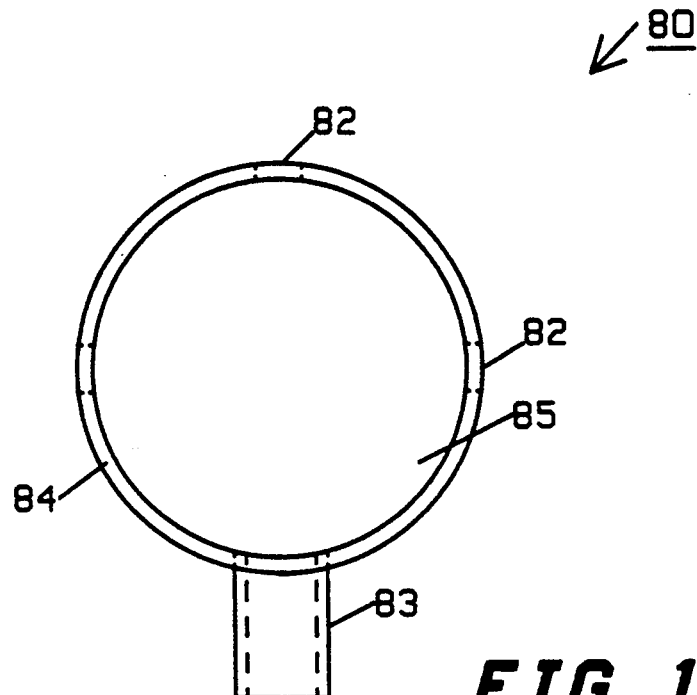
FIG. 10 shows a front view of the mini chamber.
Figure 11:
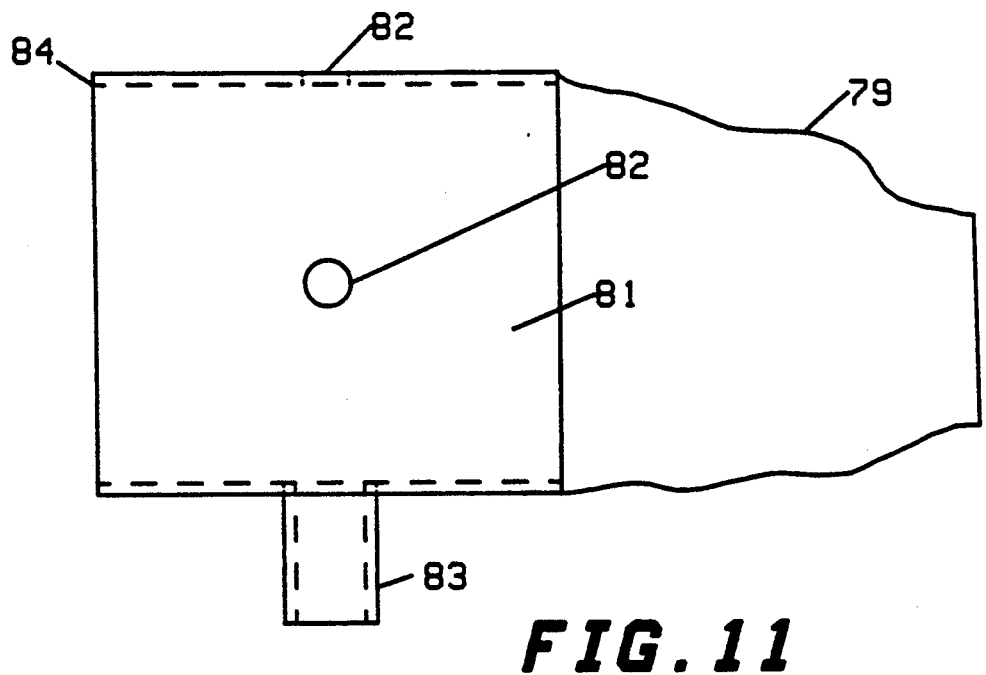
FIG. 11 shows a side view of the mini chamber.

The specific embodiments described can be used for making holes up to about six inches in diameter. Of course, the device can be made longer to accommodate even larger holes. When drilling holes less than or equal to about one inch diameter, the embodiment of FIGS. 9–11 may be used. In FIG. 9 to 11, another embodiment is disclosed for these small jobs such as pilot holes or vacuum wands. In this embodiment, a tubular chamber 80 can be connected to a battery or AC powered drill 75. The drill 75 has a grip 76, a motor housing 77 and a rotary needle 78 attached to a spindle of motor (not shown). An open end tubular chamber 80 can be flexibly connected to the drill 75 by a rubber dust cover 79. As shown in FIG. 9, both ends of the dust cover 77 are secured by clamps or bands around the peripheral surface of the chamber 80 and motor housing 77.

With respect to FIGS. 10 and 11, the tubular chamber 80 may be approximately 4.5 inches in diameter and have, for example, three intake air holes 82 in the upper portion of a peripheral wall 81. The tubular chamber 80 also has a vacuum port 83 in the lower portion of the peripheral wall 81. In this embodiment, the intake air holes 82 are ¾ inch in diameter and the vacuum port 83 is 1¼ inches in diameter.

Before starting the drill 75, the user connects a hose (not shown) to ah attachment collar 90 and places an edge surface 84 of the tubular chamber 80 against the workpiece so that the working area defined by an open end 85 is surrounded by the closed peripheral wall 81. The air intake holes 82 are attached to a vacuum cleaner (not shown) to remove the debris generated by the drilling process. The user holds the grip 76 and the collar 90 using both hands and makes a hole in the workpiece by pushing the grip 76. Any particles of debris generated due to the rotating drill bit 78 are removed from the chamber 80 through the vacuum port 83.

While specific embodiments of the invention have been shown and disclosed, it is to be understood that numerous changes and modifications may be made by those skilled in the art without departing from the scope and intent of the invention. For example, the embodiment shown in FIG. 8 can be modified by eliminating either the tool chamber 15 or the receptacle chamber 45 from either of the rooms X or Y if it is only necessary to keep one of the rooms clean. Also, the particular mechanism for attachment to the wall may be modified as well as the construction details disclosed herein. Further, the invention can be applied to tools other than drills. Various conventional cutting, drilling or punching tools such as hydraulic punchs or saws can equally benefit from this invention without requirement for a specialized tool.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is

1. A device for removing contaminants adjacent to a workpiece surface in a cleanroom, said device being used in conjunction with a tool which produces said contaminants, comprising:
    chamber means for surrounding said workpiece surface and said tool with a chamber having access means for accessing said tool;
    flow means for inducing air flow into and out of said chamber; and
    a transparent wall located perpendicular to said workpiece surface so as to form a wall of said chamber, at least one intake hole for air being located at upper portion of said wall, and another hole being located at a lower portion of said wall for connection to a source of vacuum, and wherein said chamber has an aperture for alignment with said workpiece surface and for providing access for said tool to said workpiece surface.

2. A device according to claim 1, wherein said tool is used for making penetrations in said workpiece.

3. A device according to claim 1, further comprising a plurality of suction cups for attaching said chamber to said workpiece with said aperture facing said workpiece surface.

4. A device according to claim 1, wherein said chamber has a cubic configuration with said aperture in one surface of said cube.

5. A device according to claim 4, wherein said cube includes two apertures formed in surfaces of said cube to permit a user's hands to be inserted into said chamber.

6. A device according to claim 5, further comprising an electrical outlet located inside said chamber for supplying power to said tool.

7. A device according to claim 1, wherein said chamber has a tubular configuration with one open end defining said aperture to be aligned with said workpiece surface.

8. A device according to claim 7, wherein said tubular chamber has another open end connected with a dust cover which is connected to said tool.

9. A device to prevent contamination of a clean room when said device is used in conjunction with a power tool having a housing which includes driving means for driving said power tool, comprising in combination:
    a chamber for enclosing said power tool and said housing means, wherein said power tool generates debris, said chamber including an air inlet;
    connecting means for connecting a source of vacuum to said chamber to draw air from said chamber through said air inlet;
    attaching means for attaching said chamber to a workpiece.

10. The device of claim 9, further including a flexible hose coupled to said connecting means and situated inside said chamber, whereby said flexible hose can be manipulated by a user to remove debris which accumulates inside said chamber.

11. The device of claim 9, further comprising a rubber glove attached to said chamber through which a user can insert a hand to manipulate said power tool inside said chamber.

12. The device of claim 9, wherein said attaching means includes a suction cup.

13. The device of claim 9, further comprising an electrical outlet inside said chamber for plugging in said power tool, and means for supplying electrical power to said electrical outlet.

14. The device of claim 9, wherein said chamber includes a transparent wall.

15. A device for use in conjunction with a conventional power tool to prevent contamination of a clean room when said power tool is operated, comprising in combination:
    a cube shaped chamber for enclosing at least a portion of said power tool which generates debris;
    said cube shape being defined by a metal frame supporting a plurality of transparent walls;
    one of said walls adjacent both of said opposing walls including an access port for accessing said workpiece with said portion of said power tool;
    a plurality of air inlets formed in at least an upper one of said walls and pointing toward said access port so that air drawn through said air inlets is directed toward said access port;
    a vacuum connector for connecting a source of vacuum to a lower of said walls to draw air from said chamber through said air inlets;
    a plurality of suction cups attached to said frame for attaching said chamber to a workpiece;
    a flexible hose coupled to said attaching means and situated inside said chamber;
    a pair of rubber gloves attached to apertures in opposing walls of said chamber through which a user can insert hands to manipulate said power tool inside said chamber;
    a pigtail electrical outlet inside said chamber for plugging in said power tool; and
    an electrical cord for supplying electrical power to said electrical outlet.

16. A device for use with a tool for removing contaminants adjacent to a workpiece surface, comprising:
    means for surrounding said workpiece surface with a chamber and means for inducing air flow into and out of said chamber;
    a transparent wall located perpendicular to said workpiece surface so as to form a wall of said chamber, at least one intake hole for air being located at upper portion of said wall, and another hole being located at a lower portion of said wall for connection to a source of vacuum, and wherein said chamber has an alignment aperture for alignment with said workpiece surface and for providing access to said workpiece surface; and a plurality of suction cups for attaching said chamber to said workpiece with said alignment aperture facing said workpiece surface.

17. A device for use with a tool for removing contaminants adjacent to a workpiece surface, comprising:
   means for surrounding said workpiece surface with a chamber having a cubic configuration and means for inducing air flow into and out of said chamber;
   a transparent wall located perpendicular to said workpiece surface so as to form a wall of said chamber, at least one intake hole for air being located at upper portion of said wall, and another hole being located at a lower portion of said wall for connection to a source of vacuum, and wherein said chamber has an alignment aperture in one surface of said cubic configuration for alignment with said workpiece surface and for providing access to said workpiece surface.

18. A device for use with a tool for removing contaminants adjacent to a workpiece surface, comprising:
   means for surrounding said workpiece surface with a chamber having a cubic configuration and means for inducing air flow into and out of said chamber, said chamber including two access apertures formed in surfaces of said cubic configuration to permit a user's hands to be inserted into said chamber;
   a transparent wall located perpendicular to said workpiece surface so as to form a wall of said chamber, at least one intake hole for air being located at upper portion of said wall, and another hole being located at a lower portion of said wall for connection to a source of vacuum, and wherein said chamber has an alignment aperture in one surface of said cubic configuration for alignment with said workpiece surface and for providing access to said workpiece surface.

19. A device for use with a tool for removing contaminants adjacent to a workpiece surface, comprising:
   means for surrounding said workpiece surface with a chamber having a cubic configuration and means for inducing air flow into and out of said chamber, said chamber including two access apertures formed in surfaces of said cube to permit a user's hands to be inserted into said chamber and an electrical outlet located inside said chamber for supplying power to said tool;
   a transparent wall located perpendicular to said workpiece surface so as to form a wall of said chamber, at least one intake hole for air being located at upper portion of said wall, and another hole being located at a lower portion of said wall for connection to a source of vacuum, and wherein said chamber has an alignment aperture in one surface of said cubic configuration for alignment with said workpiece surface and for providing access to said workpiece surface.

20. A device for use in conjunction with a conventional power tool to prevent contamination of a clean room when said power tool is operated, comprising in combination:
   a chamber for enclosing at least a portion of said power tool which generates debris, said chamber including an air inlet;
   connecting means for connecting a source of vacuum to said chamber to draw air from said chamber through said air inlet;
   attaching means for attaching said chamber to a workpiece; and
   a flexible hose coupled to said connecting means and situated inside said chamber, whereby said flexible hose can be manipulated by a user to remove debris which accumulates inside said chamber.

21. A device for use in conjunction with a conventional power tool to prevent contamination of a clean room when said power tool is operated, comprising in combination:
   a chamber for enclosing at least a portion of said power tool which generates debris, said chamber including an air inlet;
   connecting means for connecting a source of vacuum to said chamber to draw air from said chamber through said air inlet;
   attaching means for attaching said chamber to a workpiece; and
   a rubber glove attached to said chamber through which a user can insert a hand to manipulate said power tool inside said chamber.

22. A device for use in conjunction with a conventional power tool to prevent contamination of a clean room when said power tool is operated, comprising in combination:
   a chamber for enclosing at least a portion of said power tool which generates debris, said chamber including an air inlet;
   connecting means for connecting a source of vacuum to said chamber to draw air from said chamber through said air inlet; and
   a suction cup for attaching said chamber to a workpiece.

23. A device for use in conjunction with a conventional power tool to prevent contamination of a clean room when said power tool is operated, comprising in combination:
   a chamber for enclosing at least a portion of said power tool which generates debris, said chamber including an air inlet;
   connecting means for connecting a source of vacuum to said chamber to draw air from said chamber through said air inlet;
   attaching means for attaching said chamber to a workpiece; and
   an electrical outlet inside said chamber for plugging in said power tool, and means for supplying electrical power to said electrical outlet.

* * * * *